Figure 1:
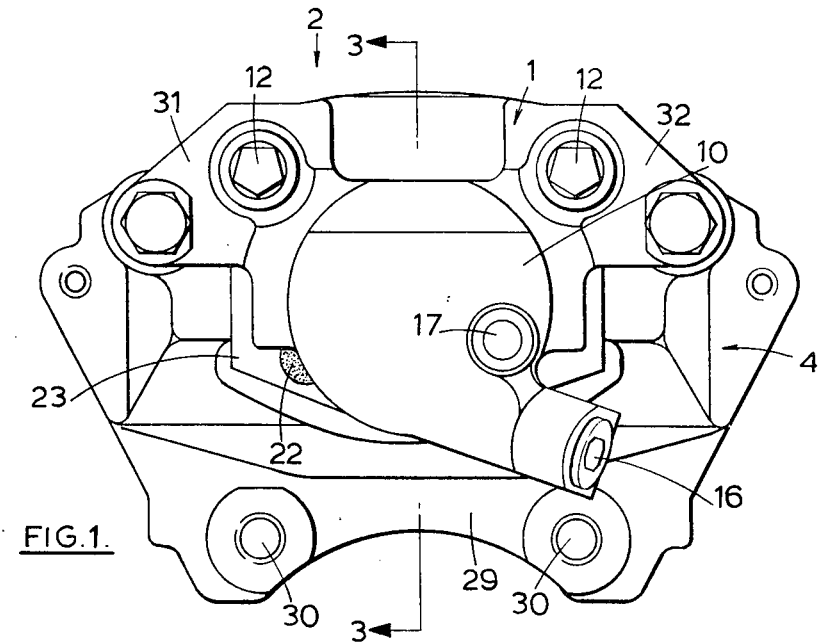

United States Patent [19]

Rath

[11] 4,049,086
[45] Sept. 20, 1977

[54] VEHICLE DISC BRAKES

[75] Inventor: Heinrich Bernhard Rath, Vallendar, Rhine, Germany

[73] Assignee: Girling Limited, Birmingham, England

[21] Appl. No.: 713,815

[22] Filed: Aug. 12, 1976

[30] Foreign Application Priority Data

Aug. 30, 1975 United Kingdom ............... 35855/75

[51] Int. Cl.² ............................................ F16D 65/02
[52] U.S. Cl. ................................................ 188/73.3
[58] Field of Search ..................... 188/72.4, 73.3–73.6, 188/206 R

[56] References Cited

U.S. PATENT DOCUMENTS

| 3,268,034 | 8/1966 | Burnett | 188/73.3 |
| 3,805,925 | 4/1974 | Schoenhenz | 188/73.3 |
| 3,917,033 | 11/1975 | Rath et al. | 188/73.3 |

Primary Examiner—Duane A. Reger
Attorney, Agent, or Firm—Scrivener, Parker, Scrivener & Clarke

[57] ABSTRACT

In an hydraulically operated disc brake one of a pair of guide pegs for a caliper works in an inner elongated bore in a resilient bush with same play in a transverse direction the bush being located in a bore of one of a pair of guide members, the play between said peg and bush accommodating changes in the circumferential spacing of the guide members or guide pegs due to distortion of a stationary, drag-taking part of the brake.

14 Claims, 4 Drawing Figures

VEHICLE DISC BRAKES

SPECIFIC DESCRIPTION

This invention relates to hydraulically operated disc brakes for vehicles of the kind comprising a stationary drag-taking part located against one face of a rotatable disc and carrying two circumferentially spaced guide means by which a caliper straddling a portion of the peripheral edge of the disc is guided for sliding movement in a direction generally parallel to the axis of the disc, two friction pad assemblies for engagement with opposite faces of the disc located in the caliper, and actuating means for applying one of the friction pad assemblies directly to one face of the disc and for causing the caliper to slide relative to the drag-taking part to apply the other friction pad assembly indirectly to the opposite face of the disc.

A problem that has arisen with brakes of this kind is that when a large drag force is being taken by the drag-taking part that member can become distorted so that the guide means become forced apart thereby increasing friction between the guide means and the caliper. This can give rise to unequal braking on opposite sides of the vehicle and also the reaction to the friction forces appears as a resultant force tending to bend the disc.

One attempt to overcome this problem has been to use only one guide means comprising a caliper pin attached to the caliper and working in a bore in an arm of the stationary part extending generally axially of the disc. To prevent rotation of the caliper about the axis of the single pin the caliper is held in abutment with a surface on the drag-taking part by a spring clip.

The disadvantage of this arrangement, however, is that the spring clip and the abutting faces of the caliper and drag-taking part are exposed to the elements and are therefore liable to corrosion.

Another arrangement for overcomming this problem, is described in our U.S. Pat. Ser. No. 3,942,353. In this the guide means comprise pins which are guided in openings in the drag-taking part. One of the openings is of elongate outline to allow for some movement of the guide pins as a result of distortion of the drag-taking part.

One disadvantage of this arrangement is that a non-circular opening in iron or steel is very difficult and expensive to produce by a cutting tool, unless the metal is so thin that the opening may be punched.

Figure 3:
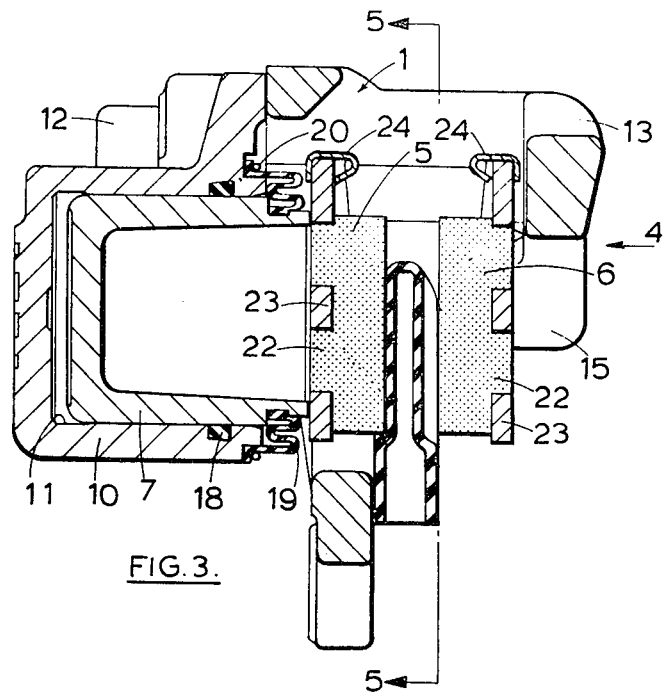

It is a further disadvantage of this arrangement that location of the caliper against rocking or tipping in the plane of FIG. 3 of that patent is provided almost entirely by the pin 92, not by the pin 114. If the pin 114 were axially long, so that it could contribute to the stability of the caliper against the said movement, then of course the hole 97 would have to be axially long which would be very difficult in the construction shown.

According to our invention in a disc brake of the kind set forth each of the guide means comprises a peg member working in a circular bore of a guide member with one of these members being secured to the drag-taking part and the other to the caliper, a resilient moulded bush having an inner elongated hole being located in one of the bores and one of the peg members running in the bush with some play to accommodate changes in the circumferential spacing of the guide means caused by distortion of the drag-taking part.

Where used herein to describe the bush the word "resilient" is intended to be interpreted as covering a bush constructed from a material which is softer than the material of the peg member and in addition has shock absorbing properties which are considerably greater than those of the peg member.

Preferably each bore is closed at one end by a flexible dirt-excluding member secured to the respective peg and to a surface of the respective guide member adjacent to that end of the bore.

The resilient bush is preferably a rubber moulding though the material could be a plastic, such as nylon which is easily and accurately mouldable. Thus the advantages of providing some free play between one of the peg members and the guide member can be simply achieved in conventionally constructed brakes. Rubber can be moulded more accurately and smoothly than iron or steel can be cast, and it is resilient enough to allow for manufacturing tolerances and to absorb vibration shocks and prevent these from causing rattle of the brake.

Preferably a second peg member is a tight sliding fit in the metal of the guide member.

The first peg member which is guided in the resilient bush may be provided with flats corresponding to the elongated shape of the hole in the bush. The internal dimensions of the bush preferably correspond in width to the spacing between the opposed flats of the first peg but are larger than those of the peg in the transverse direction so as to provide some play between the peg and the guide member along a line extending perpendicularly between the axes of the two pegs. Preferably the bush is an interference fit in a round bore in the drag-taking part in which it is located. Orientating means may be provided between the metal bore and the bush. These may comprise a location recess in the hole and a corresponding tongue on the periphery of the bush. If the first peg member is constructed with flats, as above, such separate orientation means may not be necessary.

Preferably each bore is a blind bore in the guide member, the open end of the bore through which the peg member protrudes being closed by the dirt-excluding member.

Conveniently the dirt-excluding members comprise flexible bellows or boots, one of which may be moulded integrally with the bush.

Preferably, the first peg member is axially long, so that it can contribute to the stability of the caliper. In particular, the engagement between the first peg member and the bush is preferably at least twice as long as the diameter of the peg member, to ensure that this first peg makes an adequate stability contribution.

Preferably the guide members are secured to or integral with the drag-taking part, and the peg members are secured to or integral with the caliper.

Each guide member preferably comprises an arm of the drag-taking part extending across the edge of the disc.

Figure 2:
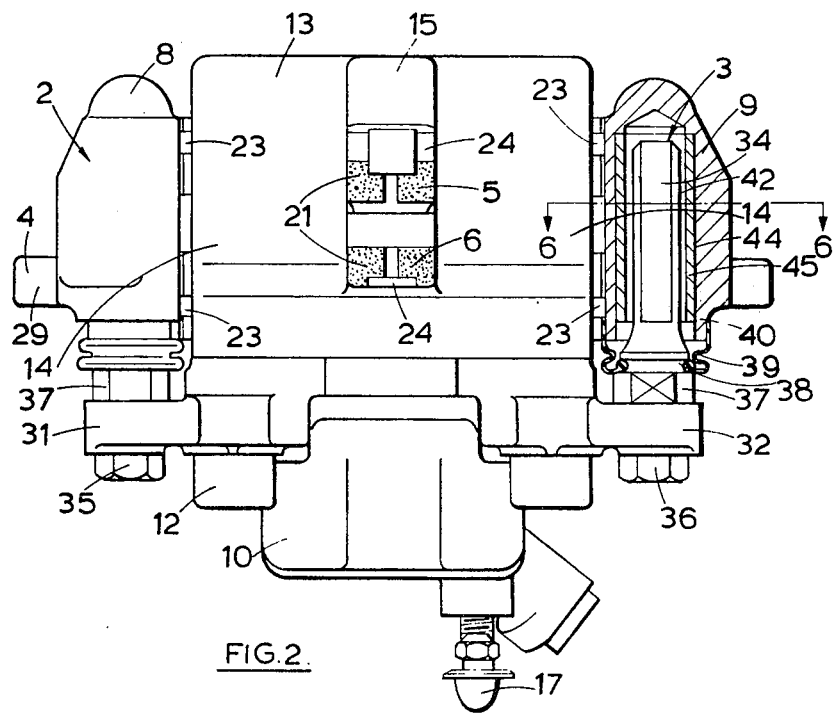
Figure 4:
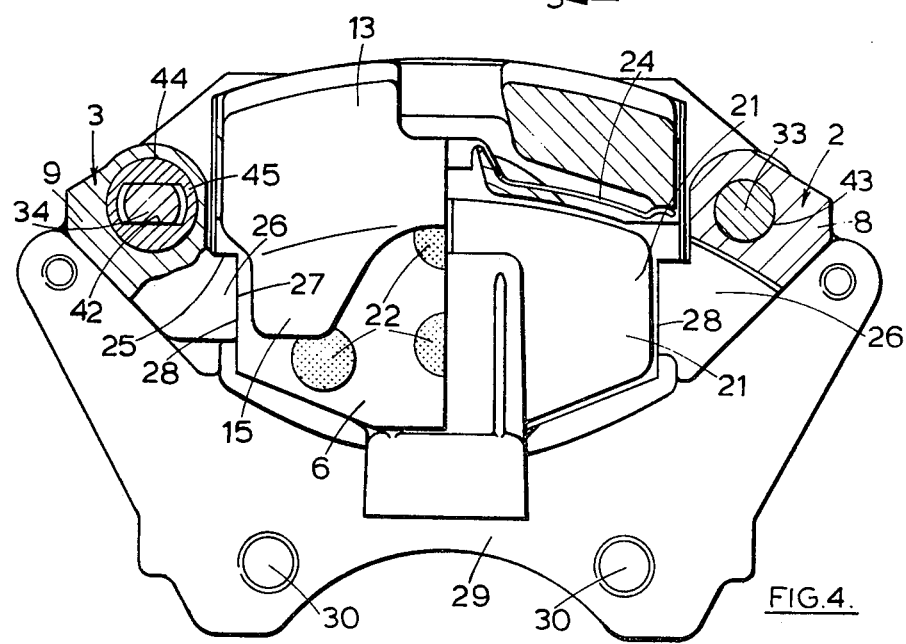

A disc brake in accordance with the invention will now be described with reference to the accompanying drawings in which the disc is omitted and in which:

FIG. 1 is a rear elevation of the brake,

FIG. 2 is a plan view of the brake in the direction of the arrow 2 in FIG. 1 and with the second guide means being shown in diametral cross-section, FIG. 3 is a cross-section of the brake on the line 3—3 of FIG. 1, and FIG. 4 is a composite view in which the left-hand half is a view in the direction of the arrow 4 in FIG. 3 but partially sectioned on the bore 6—6 of FIG. 2, and the right-hand half is a cross-section on the line 5—5 of FIG. 3.

The disc brake illustrated in the drawings comprises a caliper 1 slidably guided by guide means 2 and 3 relative to a drag-taking part 4. Pad assemblies 5 and 6 located in the drag-taking part are adapted to be applied to opposite sides of a rotatable disc, not shown, by piston 7 of the caliper, and the drag on the pad assemblies is taken by engagements between the pad assemblies and circumferentially spaced arms 8 and 9, best seen in FIG. 2, of the drag-taking part 4.

The brake will now be described in detail.

Caliper 1 comprises a first limb in the form of a cast cylinder housing 10 provided with a machined cylinder bore 11 in which works piston 7 and secured by screws 12 to a bridge member 13. The bridge member 13 comprises circumferentially spaced and axially extending bridging portion 14, as shown in FIG. 2, which extend across the periphery of the brake disc and are integral with a second limb 15 opposing the first limb 10 of the caliper.

Cylinder housing 10 incorporates an inlet port 16 and a bleed port 17 for hydraulic fluid. Piston 17 is hollow and is sealed in bore 11 by annular seal 18 located in an internal annular groove in the bore. Dirt is excluded from the cylinder bore 11 by a flexible boot 19 secured to the housing 10 by a wire clip 20.

Each pad assembly 5 and 6 comprises a block of friction material 21 secured by solid cylindrical spigots 22 to a corresponding metal backing plate 23. The pad assemblies are located in the brake by leaf springs 24 which urge the pad assemblies downwards in FIG. 4 so that steps 25 in the plates 23 are held in engagement with shoulders 26 formed on the arms 8 and 9 of the drag-taking member. Parallel faces 27 of the backing plates, seen in FIG. 4, are then in engagement with corresponding faces 28 on the shoulders 26 of which one or the other, dependent on the direction of rotation of the disc, takes the drag on the pad-assemblies on application of the brake.

The drag-taking part 4 comprises a generally flat plate 29 as shown in FIGS. 1 and 4 located on one side of the disc with the arms 8 and 9 comprising integral axial projections thereto. The plate 29 is provided with two drillings 30 for its attachment to a fixed brake-supporting part of the vehicle.

The guide means 2 and 3 will now be described. Cylinder housing 10 is provided with a pair of integral ears 31 and 32 shown in FIGS. 1 and 2, to which are respectively secured pegs 33 and 34 by screws 35 and 36 which threadedly engage with tapped holes in end portions 37 of the pegs provided with hexagonal faces for engagement by a spanner during tightening of the screws.

The portions 37 need not be hexagonal but may simply be provided with two flats.

Each of the pegs 33 and 34 is formed adjacent to the hexagonal portions 37 with an external annular recess 38 to receive a resilient annular bead on one end of a flexible rubber boot 39 which has at its other end resiliently fitted over an external cylindrical surface 40 on the corresponding arm 8 or 9.

The remaining portions 41 of each peg comprises a rod, but that of peg 34 is formed with diametrically opposed flats 42, as shown in FIG. 4. Peg 33 is a close fit in an axial blind bore 43 machined in arm 8 and is capable of sliding movement parallel to the axis of the disc and pivotal movement about the axis of the bore 43.

Arm 9 is provided with an axial blind bore 44 parallel to bore 43. A hollow resilient rubber bush 45 is an interference fit in bore 44 and has internal dimensions which correspond in width to the spacing between opposed faces 42 of peg 34 but which are larger than those of peg 34 in the transverse direction so as to provide some play between the peg 34 and arm 9 along a line extending perpendicularly between the axes of the two pegs 33 and 34.

The boots 39 are protected during transit and assembly of the brake to a vehicle by an encircling rubber band (not shown).

The operation of the brake is as follows. On supply of hydraulic fluid under pressure through port 16 to bore 11 piston 7 is urged outwardly of housing 10 to apply the adjacent pad assembly 5 to one side of the disc. The reaction on the caliper causes the pegs 33, 34 to slide axially relative to arms 8 and 9 of the drag-taking part to apply pad assembly 6 to the opposite side of the disc. Drag forces on the pad assemblies due to their engagement with the disc are taken directly by the drag-taking part 4 through the engagements between the faces 28 on backing plates 23 and faces 27.

If the braking force is very large the arms 8 and 9 of the drag-taking part may become forced apart slightly by the drag-taking forces on the pad assemblies. The spacing of pegs 33 and 34 will, however, remain the same, and the difference in spacing of the arms is accommodated by the play between bush 45 and peg 34. There will also be a slight rotation of the peg 33 relative to bore 43 associated with this distortion, but substantial pivotal movement of the caliper about the axis of peg 33 is prevented by bush 45.

It will be appreciated that the resistance to sliding movement of the pegs 33 and 34 relative to the arms 8 and 9 is substantially unaffected by increases in the separation of the arms during heavy braking.

It will be further appreciated that contamination of the guide means by dirt is practically eliminated by the bellows 39 in a simple and compact manner.

Although the pegs have been shown attached to the caliper, in an alternative arrangement the pegs are attached to the drag-taking part and work in circumferentially spaced bores in the caliper.

Means may be provided for ensuring correct orientation of the bush 45 and peg 34 during assembly of the brake. These may comprise a location recess in the periphery of the bore and a corresponding tongue on the periphery of the bush.

The peg 34 is shown as symmetrically disposed in the elongate opening in the bush 45. In practice the arms 8 and 9 only ever deflect apart, never together, in the embodiment described. However, some play is provided inwards to allow wide tolerances on the positioning of bores and pegs. More clearance could be provided on the left hand side (as shown in FIG. 4) of peg 34 than on the right hand side in the nominal (i.e. zero tolerance) condition to cater for both these effects.

I claim:

1. An hydraulically operated disc brake for a vehicle, comprising a rotatable disc, a stationary drag-taking part located against one face of said disc, a caliper straddling a portion of the peripheral edge of said disc, first and second circumferentially spaced guide means carried on said drag-taking part and adapted to guide said caliper for sliding movement in a direction generally parallel to the axis of said disc, friction pad assemblies for engagement with opposite faces of said disc located in said caliper, and actuating means for applying one of said friction pad assemblis directly to said disc and for causing said caliper to slide relative to said drag-taking part to apply the other of said friction pad assemblies indirectly to the opposite face of said disc, each of said guide means comprising guide member, said guide member being provided with a circular bore, a peg member working in said bore, one of said members being secured to said drag-taking part and the other to said caliper, a resilient moulded bush having an inner elongate bore being located in one of said bores, only the first of said peg members sliding in an elongate bore with some free play along a line extending perpendicularly between the axes of said two peg members, said first peg member being a substantially tight fit in said bush in a direction perpendicular to said line.

2. A disc brake as claimed in claim 1, wherein flexible dirt excluding members close one end of each of said bores and are secured to each of said pegs and to a surface of each of said guide members adjacent to that end of said bores.

3. A disc brake as claimed in claim 1, wherein said resilient bush is a rubber moulding.

4. A disc brake as claimed in claim 1, whereim a second of said peg members is a tight sliding fit in the metal of said second guide member.

5. A disc brake as claimed in claim 1, wherein said first peg member has diametrically opposed flats corresponding to the shape of said elongate bore in said bush.

6. A disc brake as claimed in claim 1, wherein said first peg member engages said bush for a distance at least twice as long as the diameter of said first peg member.

7. A disc brake as claimed in claim 1, wherein said bush is an interference fit in said circular bore in said first guide member.

8. A disc brake as claimed in claim 2, wherein orientating means are provided between said bore and said bush.

9. A disc brake as claimed in claim 8, wherein said orientating means comprise a location recess in the periphery of said bore and a corresponding tongue on the periphery of said bush.

10. A disc brake as claimed in claim 2, wherein each bore is a blind bore in said guide member, the open end of said bores through which said peg members protrude being closed by said dirt-excluding members.

11. A disc brake as claimed in claim 10, wherein said dirt-excluding members comprise flexible boots.

12. A disc brake as claimed in claim 1, wherein said guide members are secured to said drag-taking part, and said peg members are secured to said caliper.

13. A disc brake as claimed in claim 9, wherein each of said guide members comprise an arm of said drag-taking part extending across the edge of said disc.

14. A disc brake as claimed in claim 1, wherein a pair of integral ears are provided on said caliper, said peg members being provided with tapped holes on their end portions and screws threadably engage with said holes to secure said pegs.

* * * * *